Figure 2:
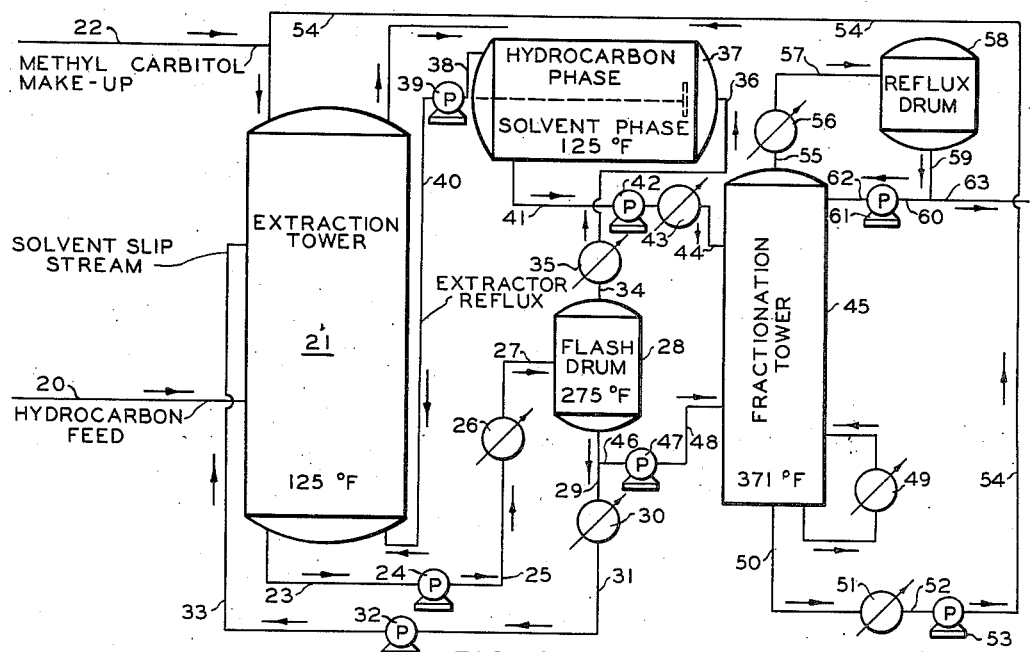

Oct. 8, 1957 H. M. HAWKINS ET AL 2,809,222
SOLVENT EXTRACTION PROCESS
Filed Nov. 27, 1953 2 Sheets-Sheet 1

INVENTORS
H. M. HAWKINS
J. A. WEEDMAN
BY
Hudson & Young
ATTORNEYS

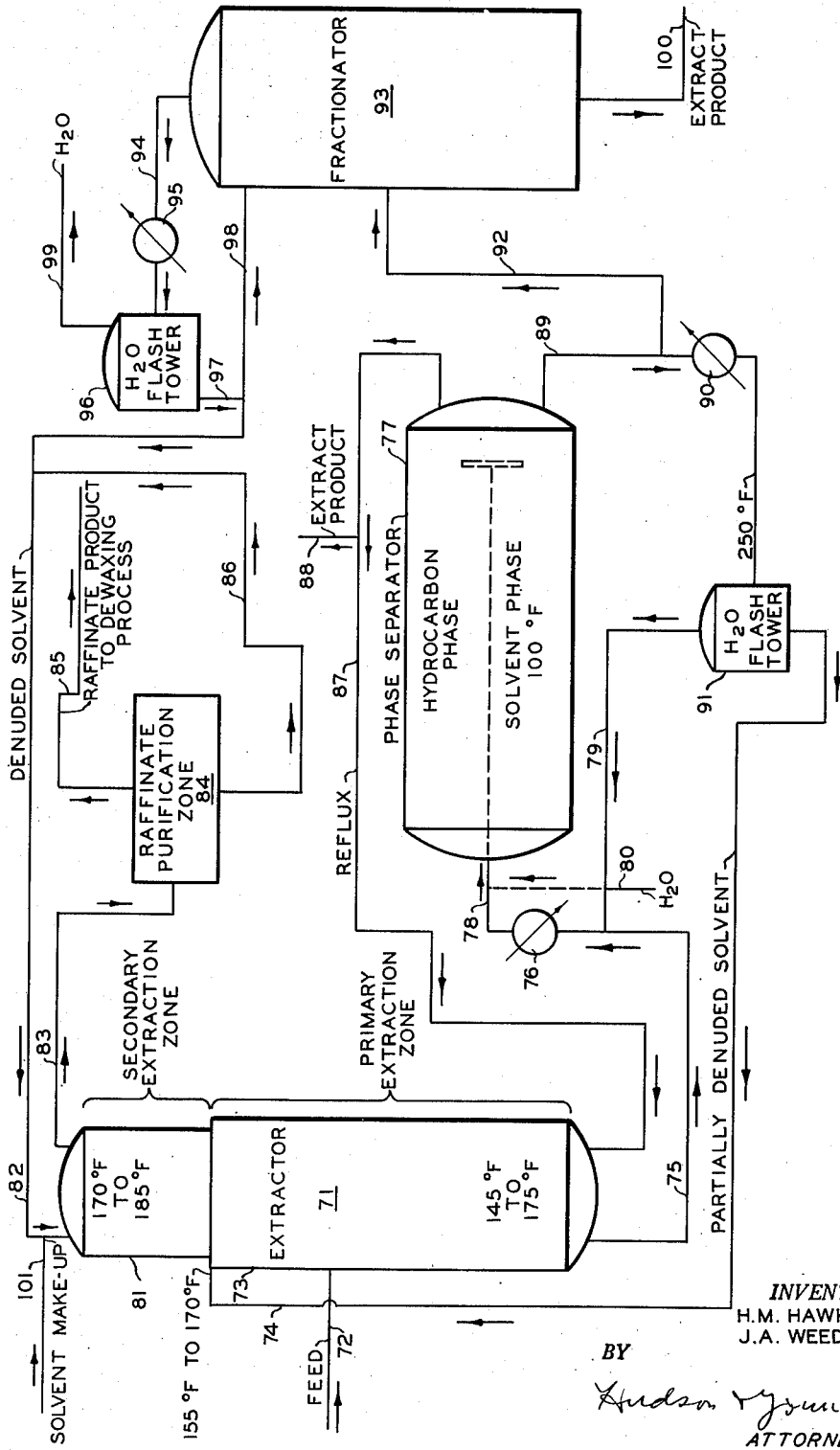

United States Patent Office 2,809,222
Patented Oct. 8, 1957

2,809,222

SOLVENT EXTRACTION PROCESS

Harold M. Hawkins and John A. Weedman, Bartlesville, Okla., assignors to Phillips Petroleum Company, a corporation of Delaware Application November 27, 1953, Serial No. 394,677

19 Claims. (Cl. 260—666)

This invention relates to solvent extraction. In one of its aspects the invention relates to a method in which partial denuding of a solvent containing an extract is practiced. In another of its aspects the invention relates to a method in which extract is substantially completely removed from solvent by employing pressure reduction. In a further aspect of the invention it relates to a method in which a combination of flashing steps is employed to recover (1) a partially denuded solvent for extraction use, (2) an extract product and (3) a completely denuded solvent. In another aspect the invention relates to a method of solvent extraction in which an extract phase is flashed to partially remove extract material from solvent, thus obtaining a partially denuded solvent, and then the partially denuded solvent, thus obtained, is fractionated to recover substantially pure solvent and extract material, resulting in the fractionation of a much smaller volume of material, and therefore requiring less fractionation capacity, then when all of the extract phase is fractionated in conventional manner. In still another aspect the invention relates to a method of extraction, employing two extraction zones, in which the solvent and natural reflux for the first extraction zone, is prepared in a primary separation zone by operation on the extract phase from the first extraction zone and the solvent for the second extraction zone is prepared in a second separation zone by operation on a portion of the solvent prepared in the first separation zone. In another aspect, still, the invention relates to a method for the solvent extraction of an organic liquid mixture, say, a hydrocarbon fraction such as a virgin naphtha, a cracked naphtha, a reformed virgin naphtha or a reformed cracked naphtha. These naphthas can be typical refinery streams which have been prepared in the course of producing such well known refinery products as gasoline, kerosene, special solvents, gas oils, diesel fuels, lubricating oil stocks and carbon black feed stocks.

In a still further aspect, this invention relates to a method for the solvent extraction of the herein described feed stocks in which two solvent extraction zones are employed, a zone in which a partially denuded solvent, from a prior extraction operation, is employed to extract a liquid and another zone in which a substantially fresh or completely denuded solvent is employed to treat a raffinate stream produced in said extraction of said last mentioned liquid.

Another aspect of the invention is the provision of apparatus comprising in combination a solvent extraction vessel having a lower extraction section, a feed inlet conduit to a mid-point of said extraction section; an upper raffinate phase washing section which, preferably is of a substantially smaller cross-section, for reasons appearing herein, an inlet for partially denuded solvent at the upper or top portion of said lower extraction zone, an inlet for substantially pure or completely denuded solvent at the top or upper portion of said raffinate phase washing section; a raffinate phase outlet at the top of said raffinate phase washing section; an extract phase outlet at the bottom of said lower extraction section; an extract phase flashing zone in which solvent containing extract is flashed to form a partially denuded solvent; a withdrawal conduit at the bottom of said flashing zone communicating therewith and with the upper portion of said lower extraction zone, for conducting partially denuded solvent to said extraction zone; a vapor condenser, a vapor draw-off conduit communicating with said flashing zone and said condenser; a conduit communicating with the bottom of said extraction zone and said condenser for passing condensed concentrated extract phase to said extraction zone as reflux therefor; a conduit also communicating with said condenser for removing concentrated extract phase from the system; a partially denuded solvent flashing zone; a conduit communicating the bottom of said extract phase flashing zone with a mid-point of said partially denuded solvent flashing zone; a vapor draw-off conduit at the top of said last-mentioned flashing zone for removal of extract product from said last-mentioned zone and a conduit communicating with the bottom of said last-mentioned flashing zone and the top of said upper raffinate phase washing section for conducting substantially completely denuded solvent to said last-mentioned section.

In a still further aspect of the invention in lieu of the second flashing zone there can be employed a fractionation zone which is heated, in which event less heat than heretofore required is required in said zone, to recover substantially pure solvent and extract material free of solvent.

In preparing the above mentioned products certain separations are difficult if not impossible to achieve by simple fractionation methods in which case distillation is utilized for the concentration of desired products which are then treated by other methods. For example: if it is desired to recover the cyclohexane from a straight run gasoline or virgin naphtha, experience has shown that careful fractionation yields a cyclohexane concentrate containing approximately 85–90 volume percent cyclohexane. This material is very difficult to purify further. The impurities comprise close boiling paraffins and methylcyclopentane.

Extraction by the process of this invention resolves the mixture into a cycloparaffin hydrocarbon extract and an acyclic raffinate. While methylcyclopentane and cyclohexane are not economically separated in the fractionation of mixtures containing them in combination with paraffin hydrocarbons, after separation by extraction the individual cyclic hydrocarbons are readily recovered in high purity by fractional distillation. Thus, it is an object of this invention to provide a practical method for recovery of pure cyclohexane from a concentrate of cyclohexane prepared by fractionation from a virgin naphtha or a straight run gasoline.

Another class of hydrocarbon compounds which are present in, but not readily obtained from, petroleum fractions, comprise the aromatic compounds—benzene, toluene, ethylbenzene and the xylenes. These materials are present in only small quantities in most crude oils and straight run gasolines. Because of the tendency of these materials to azeotrope with close boiling paraffinic and naphthenic hydrocarbons to form high and low boiling pairs, it is necessary to take relatively wide boiling range cuts in order to obtain satisfactory recovery of the desired compounds. These wide cuts are contaminated with higher boiling aromatics in the case of a benzene concentrate and by both higher and lower boiling aromatics in the case of toluene and xylene cuts. However the 6, 7 and 8 carbon atom aromatic compounds, after separation by the process of this invention, can readily be separated by fractionation to produce high purity concentrates of the desired aromatic.

Other sources of feed stock for this invention are the many streams obtained in the cracking units used in the modern refineries. These streams are highly aromatic and suitable cuts can be prepared from them by distillation to concentrate the desired aromatic compound in a relatively narrow distillation range material.

Other sources of feed for these processes comprise the reformed naphthas prepared from straight run naphtha or various cuts from virgin or cracked naphthas by the well known catalytic reforming processes employed by the petroleum industry. These reformed materials may be utilized directly as feed to the processes of our invention or they may be further fractionated to concentrate the desired compound and conserve the size of equipment required to extract the desired aromatic fraction.

This invention provides a method for preparing pure aromatic compounds or concentrates of aromatic compounds which can be further treated to prepare pure aromatic compounds.

According to this invention, there is provided a method for the solvent extraction of a liquid, for example, a hydrocarbon fraction, which comprises contacting said liquid with a solvent in an extraction zone; removing extract phase from said zone; partially denuding said solvent of extracted material within said extract phase by reducing the pressure or temperature of said extract phase; returning at least a portion of said partially denuded solvent to said extraction zone; further reducing the pressure upon at least another portion of said partially denuded solvent to produce an extract product and a substantially completely denuded solvent, and passing said substantially completely denuded solvent to a raffinate washing zone in which raffinate produced in said extraction zone is washed to remove extract material therefrom. Still according to the invention, vapors produced when first reducing the pressure upon said extract phase are cooled and condensed and at least a portion thereof can be returned to said extraction zone as reflux therefor. Still further according to the invention, vapors from further reducing the pressure upon said partially denuded solvent are cooled and condensed to form an extract product. Further, according to the invention, the extract phase which is flashed by reduction of pressure can be heated before the flashing step and similarly the partially denuded solvent can be heated prior to the second or partially denuded solvent flashing step. Still further, according to the invention, in lieu of a flashing operation, in which pure solvent or substantially completely denuded solvent is recovered together with an extract product, a fractionation step can be employed, and in said step the partially denuded solvent can be heated prior to fractionation.

Further, according to the invention, the extract phase may be reduced in temperature and phase separated to produce a partially denuded solvent and extract hydrocarbon and a portion of the partially denuded solvent thus separated can be further treated by fractionation, flashing at reduced pressure or further phase separation by washing or the like.

As will appear more fully to one skilled in the art in possession of this disclosure and from the description in connection with the drawing according to this invention, it is possible to obtain beneficial solvent extraction without having to employ as much heat as in a conventional operation or as much cooling or refrigeration as in a conventional operation to recover sufficient solvent within the method to accomplish solvent extraction. This possesses not only economic advantage but also the further advantage that in the case of readily decomposable or otherwise non-inert solvents and/or liquids to be extracted substantially, no substantial quantity of heat or, in any event, smaller quantities of heat only need be employed to recover sufficiently the solvent for reuse, reliance being had upon pressure reduction in lieu of a corresponding quantity of heat. Thus, for example, the invention is especially adapted to the production of pure cyclohexane employing triethylene glycol as a solvent upon which a maximum temperature of about 375° F. is imposed.

As solvents for the processes of my invention many organic compounds which contain oxygen, and, indeed others which have been utilized for solvent extraction of hydrocarbons, generally, have been found effective and can be utilized by one skilled in the art in practicing my invention. Specific examples of these oxygen-containing organic compounds are: methanol, ethanol, propanol, isopropanol, butanol, isobutanol, pentanol, hexanol, glycol, glycerol, diethylene glycol, dipropylene glycol, triethylene glycol, tetraethylene glycol, polyethylene glycol (molecular weight 200–400), the methyl-, ethyl-, propyl- and butyl-ethers of ethylene glycol and of diethylene glycol, the dimethyl-, diethyl-, dipropyl- and dibutyl-ethers of diethylene glycol, acetic acid, propionic acid, butyric acid, acetaldehyde, propionaldehyde, butyraldehyde, valeraldehyde, benzoicaldehyde, cinnamicaldehyde, salicylaldehyde, anisicaldehyde, phenol, mono-, di- and trinitrophenols, xylol, cresol, nitrocresol, guaiacol, eugenol, isoeugenol, piperonal (3,4-methyl-dioxybenzaldehyde), acetophenone, dioxane, benzophenone, benzalacetone, formamide, dimethyl and diethyl formide.

Temperatures in the extraction zone will, of course, depend upon the separation to be accomplished and upon the solvent selected. Ordinarily, better solvent properties for the solvent herein disclosed are found at temperatures proportional to their molecular weight. Thus, glycols, carbitols, and Cellosolves exhibit their best properties in the range 100–125° F. while diethylene glycol gives a good result from 100–250° F., triethylene glycol will give good results from 150–400° F., although as noted above, triethylene glycol is preferably not employed above about 375° F. As the molecular weight of the polyethylene glycols increases, they show better solvent properties but their decomposition temperature is below best operating temperatures. Still further, the employment of high temperatures requires increased pressures which necessitates heavier and stronger extractor vessels resulting in costs which are above or greater than the benefits derived.

The hydrocarbons which can be extracted according to the method of the invention are well-known in the art and include various fractions encountered in the oil refinery and as already discussed herein.

Figure 1:
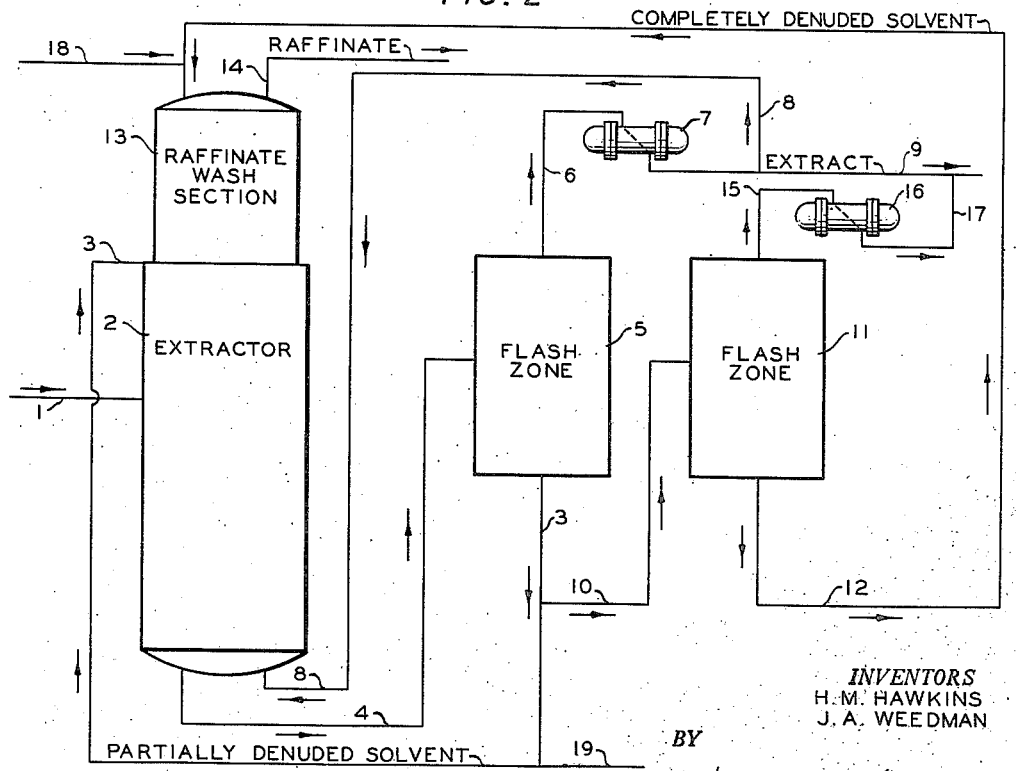

Referring now to the drawing, Figure 1 schematically illustrates a flow plan of an embodiment of this invention in which a combination of two flashing steps is employed, Figure 2 illustrates diagrammatically another embodiment of this invention in which a combination of a flash drum and a fractionator tower is employed, and Figure 3 illustrates diagrammatically yet another embodiment of this invention in which the first separation zone comprises a phase separator and the second separation zone comprises a fractionator. As will be evident to one skilled in the art, not all necessary pieces of equipment or steps which can be employed are shown although the steps of the invention for which protection is sought are shown.

Referring now to Figure 1, a hydrocarbon or other liquid to be extracted is fed by means of conduit 1 into extractor section 2 wherein it is contacted with a partially denuded solvent fed to extractor 2 by way of conduit 3. Extract is withdrawn through conduit 4 and flashed in flash zone 5. A partially denuded solvent is withdrawn from flash zone 5 and passed by way of conduit 3 to extractor 2. Overhead is taken from flash zone 5 by way of conduit 6, condenser 7, and conduit 8 and at least a part of the condensate thus obtained returned to extractor 2 as reflux therefor. If desired, at least a portion of the condensed extract phase, which is a concentrated extract phase, can be removed through conduit 9 from the process. At least a portion of the partially denuded solvent resulting upon flashing in flash zone 5, by pressure reduction, and with some heat, if desired, is passed by way of conduit 10 into flash zone 11 wherein a further pressure reduction is caused to occur thereupon flashing extract from the solvent. Some heat may be employed in flash zone 11. Substantially completely denuded solvent is passed by way of conduit 12 into raffinate washing section 13 from the top of which raffinate free of extract hydrocarbon is removed through conduit 14. Returning to flash zone 11, vapors are removed overhead by way of conduit 15, condenser 16, and conduit 17 and together with extract in conduit 9 from the system.

Fresh solvent can be added to the system by way of conduit 18. Also, if desired, solvent which has been in use for some time and which it may be desired to replace, can be withdrawn from the system through conduit 19.

In the foregoing description of an embodiment of the invention, the solvent has been assumed to be higher boiling than the extract material. When the solvent is lower boiling than the extract material, the vapors taken overhead from the flash zones 5 and 11 will consist essentially of solvent and the extract material will be removed from the bottoms of the said zones. In such an embodiment external reflux can be provided and the solvent will be condensed before it is returned to the upper portion of extractor 2, the changes in piping which are required for such operation, being obvious from the foregoing discussion.

Referring now to Figure 2, in which there is schematically shown the preparation of pure cyclohexane from a hydrocarbon feed containing approximately 85 percent cyclohexane, the remainder comprising dimethyl pentanes and some methyl cyclopentane, the feed is introduced by way of conduit 20 to extraction tower 21. The temperature at the bottom of this tower is maintained at about 125° F. and the feed is introduced at about 100° F. Solvent, in this case, methylcarbitol (atmospheric boiling point about 380° F.) is introduced at about 130° F. by way of conduit 22 into the top of tower 21. Extract phase which is formed and which contains cyclohexane is removed from tower 21 by way of conduit 23, pump 24, and conduit 25, passed through heater 26, and by way of conduit 27 into flash drum 28 wherein a temperature of about 275° F. and a reduced pressure are maintained to obtain a partially denuded solvent which is withdrawn from flash drum 28 by way of conduit 29, heat exchanger 30, conduit 31, and pumped by way of pump 32 and conduit 33 into a mid-portion of extraction tower 21. The stream just described also termed "solvent slip-stream" contains some extract hydrocarbon and solvent. Overhead from drum 28 is taken off by way of conduit 34, cooler 35, which is operated employing ordinary cooling water, and passed by way of conduit 36 into decanter drum 37. In decanter drum 37, two phases are formed— a solvent phase and a hydrocarbon phase. The hydrocarbon phase is removed from decanter 37 by way of conduit 38 and pumped by way of pump 39, conduit 40, to the bottom of extraction tower 21 to serve as reflux therefor. Solvent phase is withdrawn from decanter 37 by way of conduit 41 and pumped by way of pump 42 through heater 43 and conduit 44 into fractionator tower 45. In fractionator tower 45, solvent is freed from hydrocarbon and to this end, a portion of partially denuded solvent obtained in flash drum 28 is passed by way of conduit 46 and pumped by pump 47 and conduit 48 into fractionator tower 45. The bottom of fractionator tower 45 can be reboiled by means of heater-reboiler 49 and in this case is maintained at about 371° F. Solvent is withdrawn from tower 45 by way of conduit 50, cooler 51, conduit 52, and is pumped by pump 53 and conduit 54 to the top of extraction tower 21. Overhead from fractionator tower 45 is taken off by way of conduit 55, cooler 56, and conduit 57 into a reflux drum 58 from which at least a portion of the cyclohexane obtained can be recycled to the top of fractionator tower 45 by way of conduits 59 and 60, pump 61, and conduit 62. Product is removed from the system by way of conduit 63.

Referring to Figure 3 a lubricating oil fraction enters extractor 71 through line 72 and contacts in primary extraction zone 73, a partially denuded solvent entering through line 74 at a temperature of 155–185° F. An extract phase at a temperature in the range 145–175° F. is removed from primary extraction zone 73 by way of line 75 to cooler 76 wherein the temperature of the extract phase is reduced to approximately 100° F. before entering phase separator 77 by way of line 78. Water is injected into the extract phase in line 75 or line 78 by way of lines 79 and 80. This water is added in quantities sufficient to break out the desired quantity of extract hydrocarbon. Usually the amount of extract hydrocarbon removed reduces the quantity of extract in the resulting solvent phase to the range 10 to 50 volume percent of said solvent phase and will require water equivalent to 10–50 percent of the volume of the extract phase.

The raffinate from primary extraction zone 73 enters secondary extraction zone 81 and passes by way of line 83 to raffinate purification zone 84 wherein a series of treating steps, that is, washing, drying, and solvent fractionation, produces a raffinate product through line 85 which is suitable for dewaxing feed stock and eventual utilization as lubricating oil base stock of improved viscosity index and pour point. Denuded solvent is produced through line 86 and is recycled to secondary extraction zone 81 by way of line 82.

The hydrocarbon phase from phase separator 77 is removed by way of line 87 and a portion sufficient to saturate the extract phase with hydrocarbon is returned to extractor 71 to serve as reflux. The remaining hydrocarbon phase is withdrawn through line 88 as extract product.

The solvent phase is removed from phase separator 77 by way of line 89 and heater 90 to water flash tower 91 wherein water is removed from the partially denuded solvent by flashing at approximately 250° F. under a pressure in the approximate range 5 p. s. i. a. to atmospheric. The water removed is passed by way of line 79 to mix with additional extract phase circulating through line 75, cooler 76 and line 78. Partially denuded solvent having a water content of approximately 2.5 percent by weight is removed by way of line 74 and recycled to the top of primary extraction zone 73. A portion, 10–50 percent, of the solvent phase from line 89 is continuously removed through line 92 and charged to fractionator 93 wherein water and solvent are removed overhead by way of line 94 and heater 95 to water flash tower 96. Denuded solvent which has been dehydrated to the range 0 to 2.5 percent by weight of water is removed by way of line 97, a portion returned by way of line 98 to reflux fractionator 93 and the remainder recycled by way of line 82 to secondary extraction zone 81. An extract product is removed from fractionator 93 by way of line 100. Solvent makeup is supplied through line 101.

A solvent which can be utilized advantageously in the process as described in connection with Figure 3 is phenol or phenol modified by the addition of not more than 3 percent of water by weight. The solvent to feed ratio is maintained in the range 0.5 to 4.0 preferably 1.0 to 3.0 depending on the economics of the process and especially upon the feed stock involved.

From the foregoing description of the invention, it will be obvious to those skilled in the art that employment of a solvent slip-stream will permit employment of smaller fractionation towers or secondary flash drums for obtaining of pure solvent and product and will also permit considerably a reduction in heat required, which are important practical considerations. Further, it will be obvious that not all of the solvent is subjected to high temperatures upon each extraction cycle but that many cycles are accomplished by the solvent slip-stream with only a minor portion of the solvent passing through the fractionation tower in any one cycle.

Also, it will be obvious from this specification that the partially denuded solvent stream is obtained under non-solvent extraction conditions and that the partially denuded solvent stream does not contain any material not originally contained in the feed or in the solvent before it was used.

In the operation of the slip-stream according to the invention, the partially denuded solvent will contain ordinarily from about 1 percent or less to about 40 percent by weight or more of extract material and in the case given of the purification of cyclohexane, the solvent contains from about 3 percent to about 10 percent of cyclohexane.

Reasonable variation and modification are possible within the scope of the foregoing disclosure, drawing, and the appended claims to the invention, the essence of which is a method of liquid-liquid extraction employing two extraction zones and two separation zones in which the solvent and natural reflux for the first extraction zone are prepared in the first separation zone by operation on the extract phase from said first extraction zone and the solvent for the second extraction zone is prepared in the second separation zone by operation on a portion of the solvent prepared in said first separation zone, by a series of flashings by pressure reduction and/or flashing by heating and pressure reduction followed by cooling of the flashed vapors to form separate phases or by merely cooling to form phases, the second extraction zone yielding a raffinate and the first extraction zone yielding an extract phase.

We claim:

1. A method for the solvent extraction of a liquid in a solvent extraction zone with a solvent which is higher boiling than extract removed from said liquid in said zone to which is fed said liquid at a point intermediate its ends and from which there are removed a raffinate at a raffinate end of said zone, at which end solvent free of extract is introduced, and an extract at an extract end of said zone which comprises the steps of contacting said liquid with said solvent under solvent extraction conditions in a solvent extraction zone; removing an extract phase from said zone; partially separating extract material from said extract phase under non-solvent extraction conditions, including at least one flashing forming a partially denuded solvent stream in which the ratio of solvent to the remainder of the stream has been substantially increased and in which there is contained 1–40 percent by weight of the solvent of extract removed from said liquid in said zone; recycling at least a portion of said extract material as reflux to said zone and continuously recycling said partially denuded solvent to said extraction zone at a point intermediate said feed and said end at which raffinate is removed from said zone.

2. A method for the solvent extraction of a liquid which comprises the steps of contacting said liquid under solvent extraction conditions in a solvent extraction zone, having an extract and a raffinate end, with a solvent selected so as to be higher boiling than extract removed from said liquid in said zone; removing an extract phase from the extract end of said zone; reducing the pressure upon said removed extract phase so as to separate extract material therefrom to form a partially denuded solvent containing 1–40 percent by weight of the solvent of extract removed from said liquid in said zone; recycling at least a portion of said partially denuded solvent to said extract zone intermediate the feed and the raffinate end of said zone; recycling at least a portion of said separated extract material to said extraction zone as reflux therefor; reducing further the pressure upon at least a portion of said removed extract phase to obtain therefrom substantially completely denuded solvent; and continuously returning said completely denuded solvent, as fresh solvent, to the raffinate end of said extraction zone.

3. The method of preparing substantially pure cyclohexane from a hydrocarbon feed containing a substantial proportion of cyclohexane, dimethyl pentanes and methylcyclopentane which comprises introducing said feed to an extraction zone; introducing a solvent, higher boiling than cyclohexane, to said zone; maintaining and operating said zone under conditions to form a raffinate phase and an extract phase; removing said raffinate phase from a raffinate removal end of said zone; removing said extract phase from another end of said zone; flashing at least some of said extract phase under conditions so as to form a partially denuded solvent slipstream containing 1–40 percent by weight of said solvent of extract removed from said feed; returning said slipstream to said zone intermediate the point of feed to said zone and said raffinate removal end of said zone; condensing flashed vapors formed upon said flashing of said extract phase thus obtaining a hydrocarbon phase and a solvent phase; fractionating said solvent phase to remove substantially all hydrocarbon contained dissolved therein, thus substantially completely denuding said solvent; continuously returning said solvent, as fresh solvent, to the raffinate end of said zone and recovering substantially pure cyclohexane as a product of the process from said solvent in said fractionating thereof.

4. A method according to claim 3 wherein the solvent is triethylene glycol.

5. A method according to claim 3 wherein the partially denuded solvent contains 3–10 percent of cyclohexane.

6. A method according to claim 1 wherein the separation of the extract material to form said partially denuded solvent is accomplished at least in part by reducing the pressure upon said extract phase after its removal from said extraction zone.

7. A method according to claim 1 wherein said liquid contains cyclohexane.

8. A method according to claim 6 wherein at least a portion of said partially denuded solvent is subjected at least to a further reduction of pressure so as to obtain therefrom substantially completely denuded solvent, which can be returned to the extraction zone, and an extract product.

9. A process for the solvent extraction of hydrocarbons in liquid-liquid contact with each other which comprises contacting in a solvent extraction zone having a raffinate end and an extract end said hydrocarbons under solvent extraction conditions with a solvent, which is higher boiling than extract removed from said hydrocarbon; withdrawing an extract phase containing extract hydrocarbon and solvent from the extract end of said zone; heating said extract phase; subjecting said extract phase to flashing by pressure reduction in a pressure reducing step to form a partially denuded solvent containing 1–40 percent by weight of said solvent of extract removed from said hydrocarbons; returning at least a portion of said partially denuded solvent to a place intermediate said raffinate end and said extract end of the extraction zone; subjecting at least another portion of said partially denuded solvent to fractionation to form substantially completely denuded solvent and extract hydrocarbon product and continuously returning said substantially completely denuded solvent to said extraction zone at said raffinate end.

10. A process according to claim 9 wherein the extract and solvent flashed from the extract phase in said pressure reducing step are cooled causing a phase separation and at least a portion of the hydrocarbon phase is returned to the solvent extraction zone as reflux therefor.

11. A process for the solvent extraction of hydrocarbons in liquid-liquid contact with each other which comprises contacting said hydrocarbons with a solvent which is higher boiling than extract removed from said hydrocarbons under solvent extraction conditions in a solvent extraction zone having a raffinate end and an extract end; withdrawing an extract phase containing extract hydrocarbon and solvent from the extract end of said zone; subjecting said extract phase to pressure reduction in a pressure reducing step to form by flashing a partially denuded solvent containing 1–40 percent by weight of said solvent of extract removed from said hydrocarbons; returning at least a portion of said partially denuded solvent to a place intermediate said raffinate end and said extract end of the solvent extraction zone; subjecting at least another portion of said partially denuded solvent to fractionation under fractionating conditions to obtain a substantially completely denuded solvent and an extract hydrocarbon material and continuously returning said substantially completely denuded solvent to said solvent extraction zone at said raffinate end.

12. A method according to claim 11 wherein said hydrocarbons comprise essentially a mixture of cyclohexane, dimethyl pentanes, and some methylcyclopentane and wherein the solvent is methylcarbitol.

13. The solvent extraction of a liquid in a solvent extraction zone, which has a raffinate recovery end and an extract phase recovery end, which comprises feeding said liquid to a point intermediate the ends of said zone; feeding solvent which is higher boiling than extract removed from said liquid and substantially free from any of said liquid or extract to the raffinate end of said zone; recovering an extract phase from said zone; partially separating extract material from said extract phase by flashing at a reduced pressure forming a partially denuded solvent containing 1-40 percent by weight of said solvent of extract removed from said liquid; recycling a portion of said partially denuded solvent to a point intermediate the raffinate recovery end of said zone and the point to which said liquid is fed; completely recovering extract material from at least another portion of said partially denuded solvent, thus obtaining substantially completely denuded solvent; and feeding said substantially completely denuded solvent, as said solvent substantially free from any of said liquid, to the raffinate end of said zone.

14. A solvent extraction according to claim 12 wherein a portion of said partially denuded solvent is further flashed at reduced pressure to obtain said completely denuded solvent.

15. A solvent extraction according to claim 12 wherein the extract material is separated to form said partially denuded solvent by heating and flashing said extract phase at a reduced pressure.

16. A solvent extraction according to claim 15 wherein the vapors obtained from said flashing are cooled to form a solvent phase and another phase at least a portion of which is returned as reflux for said solvent extraction zone; and the solvent phase is subjected to separation to recover it completely denuded of any of said liquid.

17. The solvent extraction of a hydrocarbon in a solvent extraction zone, which has a raffinate recovery end and an extract phase recovery end, which comprises feeding said hydrocarbon to a point intermediate the ends of said zone; feeding solvent which is higher boiling than extract removed from said hydrocarbon and substantially free from any of said hydrocarbon to the raffinate end of said zone; recovering an extract phase from said zone; partially separating extract material from said extract phase under non-solvent extracting conditions including at least one flashing, thus forming a partially denuded solvent containing 1-40 percent by weight of said solvent of extract removed from said hydrocarbon; recycling a portion of said partially denuded solvent to a point intermediate the raffinate recovery end of said zone and the point to which said hydrocarbon is fed; completely recovering extract material from at least another portion of said partially denuded solvent, thus obtaining substantially completely denuded solvent; and feeding said substantially completely denuded solvent, as said solvent substantially free from any of said hydrocarbon to the raffinate end of said zone.

18. A solvent extraction according to claim 17 wherein extract material is separated from said extract phase by heating said extract phase; subjecting the heated extract phase to flashing by pressure reduction in a pressure reducing step to form said partially denuded solvent; and wherein at least a portion of said partially denuded solvent is subjected to fractionation to substantially free it from any of said hydrocarbon to form said completely denuded solvent.

19. The solvent extraction of a liquid hydrocarbon in a solvent extraction zone which has a raffinate recovery end and an extract phase recovery end, which comprises feeding said hydrocarbon to a point intermediate the ends of said zone; feeding solvent boiling higher than said liquid hydrocarbon substantially free from any of said hydrocarbon to the raffinate end of said zone; recovering an extract phase from said zone; partially separating extract material from said extract phase by flashing the same at a reduced pressure forming a partially denuded solvent containing 1-40 percent by weight of extracted hydrocarbons; recycling a portion of said partially denuded solvent to a point intermediate the raffinate recovery end of said zone and the point to which said liquid is fed; completely recovering extract material from at least another portion of said partially denuded solvent, thus obtaining substantially completely denuded solvent; and feeding said substantially completely denuded solvent, as said solvent substantially free from any of said hydrocarbon, to the raffinate end of said zone.

References Cited in the file of this patent

UNITED STATES PATENTS

| | | |
|---|---|---|
| 2,031,205 | Bray | Feb. 18, 1936 |
| 2,100,429 | Bray | Nov. 30, 1937 |
| 2,149,643 | Tijmstra | Mar. 17, 1939 |
| 2,216,933 | Atkins | Oct. 8, 1940 |
| 2,270,827 | Tijmstra | Jan. 20, 1942 |
| 2,396,299 | Sweeney et al. | Mar. 12, 1946 |
| 2,593,931 | Stearns | Apr. 22, 1952 |
| 2,613,174 | Ockert | Oct. 7, 1952 |
| 2,616,912 | Dickinson | Nov. 4, 1952 |
| 2,654,792 | Gilmore | Oct. 6, 1953 |
| 2,663,670 | Francis et al. | Dec. 22, 1953 |
| 2,711,433 | Poffenberger | June 21, 1955 |